United States Patent [19]

McEwan

[11] Patent Number: 4,767,424
[45] Date of Patent: Aug. 30, 1988

[54] COLUMN FOR REMOVING LIQUID FROM A GAS

[75] Inventor: Malcolm W. McEwan, The Hague, Netherlands

[73] Assignee: Shell Oil Company, Houston, Tex.

[21] Appl. No.: 836,371

[22] Filed: Mar. 5, 1986

[30] Foreign Application Priority Data

Mar. 5, 1985 [NL] Netherlands ......................... 8500611

[51] Int. Cl.⁴ .............................................. B01D 19/00
[52] U.S. Cl. ........................................ 55/184; 55/186; 55/329; 55/337; 55/348; 55/456
[58] Field of Search .................................. 55/183–188, 55/329, 337, 345, 347, 348, 456, 457; 122/488–492

[56] References Cited

U.S. PATENT DOCUMENTS

| | | | |
|---|---|---|---|
| 2,331,787 | 10/1943 | Lincoln | 55/348 |
| 2,792,075 | 5/1957 | McBride et al. | 55/321 |
| 3,010,537 | 11/1961 | Baker et al. | 55/337 X |
| 3,877,904 | 4/1975 | Lowrie | 55/184 X |
| 3,923,010 | 12/1975 | Chlique | 122/491 X |
| 4,015,960 | 4/1977 | Nutter | 55/355 |
| 4,318,368 | 3/1982 | Carson et al. | 55/348 X |
| 4,349,360 | 9/1982 | Schuurmans et al. | 55/348 X |
| 4,566,883 | 1/1986 | Paardekooper et al. | 55/329 |

FOREIGN PATENT DOCUMENTS

| | | |
|---|---|---|
| 0048508 | 3/1982 | European Pat. Off. . |
| 3024060 | 1/1982 | Fed. Rep. of Germany . |
| 420061 | 4/1967 | Switzerland . |
| 1123546 | 8/1968 | United Kingdom . |

*Primary Examiner*—Charles Hart
*Attorney, Agent, or Firm*—Mark A. Smith

[57] ABSTRACT

A column for separating a liquid from a gas by means of a horizontal liquid coalescer and a centrifugal liquid separator is improved by positioning the coalescer below the centrifugal separator and extending both these devices over the whole cross section of the column.

11 Claims, 2 Drawing Sheets

4,767,424

COLUMN FOR REMOVING LIQUID FROM A GAS

BACKGROUND OF THE INVENTION

The invention relates to a vertical column for removing a liquid from a gas.

There are numerous examples in the petroleum and chemical industry where an entrained liquid has to be removed from a gas. The liquid may be entrained in smaller or larger quantities by a flowing gas, in the form of small or large drops, suspended in the form of a mist, as a plug (especially in pipelines), as a foam, etc.

Well known examples are water and liquid hydrocarbons in natural gas, liquid absorption agents in a gas treated with such agents and lubricating oil or crude oil in hydrogen or hydrocarbon gas. An argument for the use of a vertical column for removing liquid from gas is that it occupies little ground area, which is particularly advantageous for offshore application on production platforms, but also in refineries.

Devices of the above mentioned type are widely used in the oil and chemical industry. They may be applied in columns for merely separating gas/liquid mixtures, as well as in columns for contacting liquids and gases for generating an exchange of matter and/or heat between the phases and subsequently separating the phases. The above devices are normally mounted in or over openings in one or more horizontal trays. If the above mentioned devices are applied in columns for contacting liquids and gases, they are provided with mixing chambers having separate liquid and gas inlet means. In said mixing chambers the liquid is atomized in the supplied gas stream so that matter and/or heat between the liquid and gas may be exchanged. The so formed mixture of liquid and gas is supplied to the swirl imparting means of said devices for subsequently separating the liquid from the gas stream.

An example of an apparatus of the above type is described in British patent 1,123,546. This known apparatus comprises a cylindrical wall enclosing an inner space, in which a vane assembly is arranged for separating liquid from a gas/liquid mixture. The cylindrical wall is provided with liquid discharge openings for the withdrawal of the major part of the separated liquid.

Commonly assigned copending patent application Ser. No. 586,482 filed Mar. 5, 1984 which issued on Jan. 28, 1986 as U.S. Pat. No. 4,566,883, describes a further improvement of such a device. It describes an apparatus for separating gas/liquid mixtures comprising an outer vessel having an inlet and separate gas and liquid outlets. A plurality of gas/liquid separating units are mounted in a horizontal tubesheet disposed in the vessel. Each separating unit has a vertical tubular member that defines an inner and outer space with the lower end of the tubular member communicating with the inlet. A swirl vane is mounted in each of the tubular members for imparting a swirl to the gas/liquid mixture to separate the gas and liquid. A primary gas outlet tube extends into each of the tubular members for removing the gas while the liquid is removed through discharge openings in the tubular members. Secondary gas outlets are positioned outside the tubular members while a demister mat is provided for removing any remaining liquid coming from the primary gas outlet tubes.

A problem that arises in the treatment of a given quantity of gas per unit of time if a relatively small diameter column is chosen is that the gas velocity is relatively high, so that there is less time for the liquid separation, and so this proceeds less efficiently.

SUMMARY OF THE INVENTION

The object of the present invention is to present such a column, wherein efficient separation is possible within a relatively very large range of gas velocities. The advantage of this is that even for applications with a widely fluctuating gas flow rate, a column with a relatively small diameter will nevertheless suffice, and that compact columns can be employed even for very large quantities of gas—as is often the case with natural gas.

The present invention provides a column for separating liquid and gas within a vertical column containing a centrifugal liquid separator means and a horizontal coalescer or demister means. In accordance with the present invention, a horizontal coalescer is arranged in the vertical column above the gas inlet and extended over the whole cross section of the column. Above the coalescer and also extended over the whole cross section of the column a centrifugal liquid separator is arranged, consisting of two horizontal trays between which vertical swirl tubes extend, each from an opening in the lower tray to some distance below a coaxial opening in the upper tray and provided with means for the discharge of secondary gas and of liquid from the space between the trays outside the swirl tubes. A liquid outlet is arranged below the gas inlet and a gas outlet is provided above the liquid separator. And, means are provided in the lower part of the swirl tubes to impart to the gas a rotary movement about a vertical axis.

BRIEF DESCRIPTION OF THE DRAWINGS

The invention will now be further illustrated with reference to the accompanying drawings.

DESCRIPTION OF THE INVENTION

Figure 3:
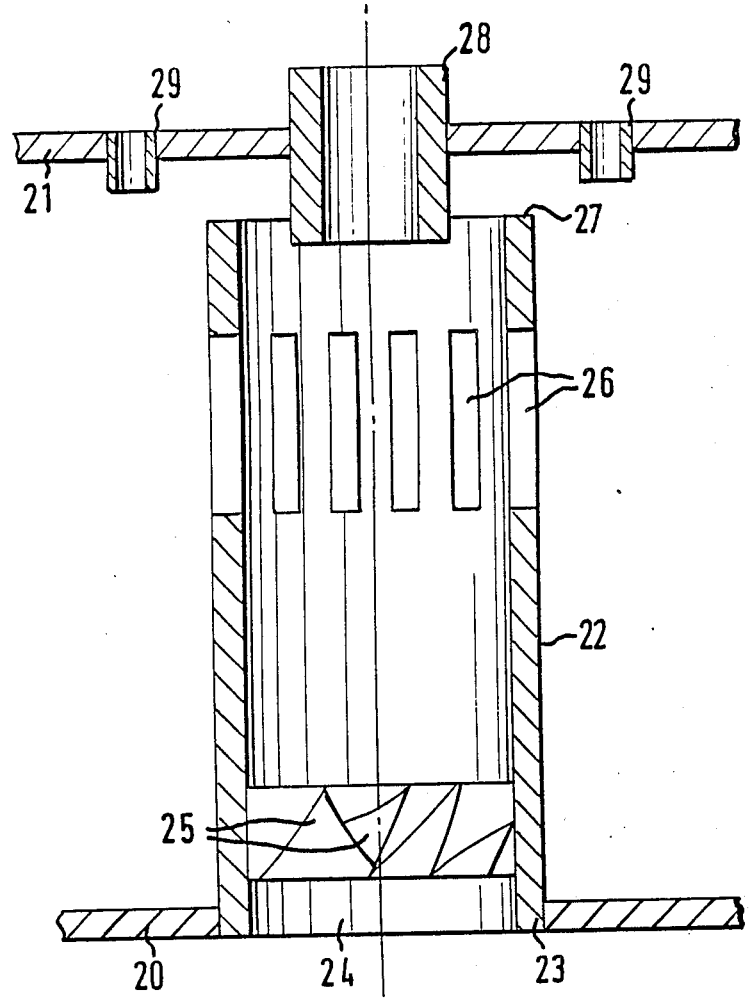
FIG. 3 is a vertical sectional view of a swirl tube of the centrifugal separator according to an embodiment of the invention.

It has now been found that the maximum gas velocity for which a desirable liquid separation is obtained in a vertical column with the coalescer and the centrifugal separator arranged according to the present invention is four times higher than the maximum velocity in a vertical column containing only a horizontal demister mat. If, however, the column comprises just the centrifugal liquid separator, then even at considerably lower gas velocities than the maximum gas velocity which is admissible according to the invention the gases will not be sufficiently dried if the liquid is present in a finely dispersed form.

In practice, the operation of the coalescer in the column according to the invention appears to differ according to the gas velocity. At relatively low gas velocities the coalescer removes all liquid from the gas—the liquid showers down out of the coalescer and is discharged from the bottom of the column. At higher gas velocities, although the coalescer coalesces the liquid drops, they are nevertheless carried by the gas up and out of the coalescer and are removed from the gas in a centrifugal separator.

An aspect that contributes to the enhanced separating capacity of the column according to the invention is the pressure drop over the coalescer, which leads to an ideal distribution of the gas over the column diameter in and above the coalescer, so that the influence of the, necessarily non-ideal, gas inflow to the column is eliminated.

There are numerous horizontal coalescers available for vertical columns. A well know example is the demister mat. All of these are relatively tenuous (large permeability) and have a relatively large specific (internal) surface area. Their operation is based on drop capture by collision of drops with internal surfaces, followed by drop growth on these surfaces, and finally by removal of the grown drop either by the gas or by gravity.

The centrifugal separator functions as follows:

The gas flows upwards, distributes itself over the swirl tubes and is set in rotation. This causes the liquid drops to be flung in the swirl tubes against the tube wall, and under the influence of the upward component of the gas movement the liquid film present on the tube wall, together with a quantity of—secondary—gas, is discharged over the top edge of the swirl tube to the space between the trays outside the swirl tubes. In the meantime the main gas stream—the primary gas—leaves the centrifugal separator via the openings in the upper tray coaxial with the swirl tubes. In the space between the trays outside the swirl tubes the liquid is separated from the secondary gas by gravity (the gas velocity being low there) and the secondary gas and the liquid are each discharged separately from this space. An advantage of this type of centrifugal separator that is particularly important at high gas velocities is that the separated liquid does not shower down in the column and cannot therefore be re-atomized by the upwardly flowing gas below the centrifugal separator. It also saves the coalescer from being showered by falling liquid.

According to a preferred embodiment of the invention, the gas inlet consists of an admittance with a supply and distribution assembly extending horizontally in the column, the assembly consisting of a longitudinal chamber connected to the inlet and having at least one open side with a grid of guide vanes disposed one behind the other, seen in the direction of flow. By means of this supply and distribution assembly, the gas is evenly distributed by the guide vanes over the cross section of the column, which brings about an additional improvement of the liquid separation in the coalescer/centrifugal separator combination. A further advantage is that the supply and distribution assembly separates from the gas any waves of liquid which may suddenly occur in the gas stream, such as can happen, for example, in pipelines for natural gas transport, the separation being effected by the liquid colliding with the guide vanes and falling down inside the column. After having been distributed by the vanes over the column cross section, the gas flows up to the coalescer.

The coalescer can have many forms which are known per se and may, for example, consist of a bed of layers of metal gauze or a layer of vanes or a layer of structured packing. These three sorts of coalescer have the advantage of being commercially available and operating efficiently in the column according to the invention.

The liquid separator is also preferably provided with vertical tube pieces which project down from the openings in the upper tray into the swirl tubes and have a smaller diameter than these latter. This arrangement enhances the separation betwen primary gas on the one hand and secondary gas and liquid on the other hand, since these latter cannot get from the swirl tubes into the openings in the upper tray for primary gas.

According to a preferred embodiment, the means for discharging the secondary gas from the space between the trays consist of vertical tubelets through the upper tray, and the means for discharging liquid from the space between the trays consist of one or more vertical discharge pipes which extend from this space to the bottom of the column. This arrangement has the advantage that the secondary gas, after having been separated from liquid in the said space between the trays, is immediately returned to the primary gas, and the liquid is added to the liquid at the bottom of the column after coming from the coalescer, so that the secondary gas and the liquid removed in the centrifugal separator do not require separate treatment.

In order to improve even further the liquid separation in the centrifugal separator, openings are preferably provided in accordance with the invention at the top of the swirl tubes for discharging liquid to the space between the trays outside the swirl tubes. This has the advantage that less secondary gas is carried to the space between the trays.

The column 1 according to the depicted embodiment of the invention comprises a supply and distribution assembly 3 connected to the gas inlet 2 and arranged at some distance above the lower part 4 of the column which functions as a liquid collecting space. The part 4 is provided with a liquid outlet 5.

Figure 2:
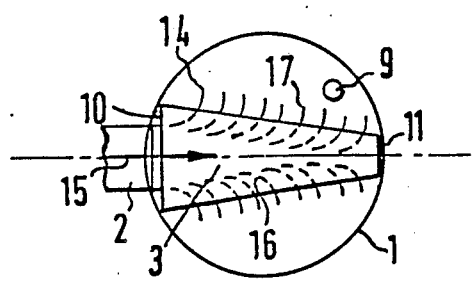
FIG. 2 is a horizontal sectional view of the column taken along the line II—II of FIG. 1.

At some distance above the assembly 3, is the coalescer, at location 6. The coalescer extends horizontally over the whole cross section of the column. At some distance above the coalescer is the centrifugal separator, at location 7. The centrifugal separator also extends over the whole cross section of the column. The centrifugal separator is situated at some distance below the gas outlet 8. A liquid discharge pipe 9 runs down from the centrifugal separator, through the coalescer, along the assembly 3 (see FIG. 2) and then into the liquid collecting space 4.

The supply and distribution assembly 3 consists of a longitudinal chamber connected to the inlet 2 and enclosed by a vertical front wall 10 attached around the inlet 2 and a vertical rear wall 11, as well as an upper wall 12 and a lower wall 13. The last two walls 12 and 13 run horizonally, extend over practically the entire diameter of the column 1 and have a trapezoidal periphery. The two vertical sides of the chamber between the walls 10 and 11 are open and between the upper and lower walls 12, 13 are arranged the vertical guide vanes 14 which project through the said open sides to outside the chamber. The vanes 14 are grouped in two grids of vanes disposed one behind the other, looking in the direction of flow. The vanes 14 each comprise a part 16 running almost parallel with the direction of flow 15 and a part 17 substantially perpendicular thereto.

The coalescer 6 comprises two horizontal supporting means 18 and 19 which are arranged in the column at some distance from each other, and between them a coalescer bed 33 consisting of layers of metal gauze.

The centrifugal separator at location 7 comprises two horizontal trays 20 and 21 (see FIG. 3), as well as a number of swirl tubes 22, one of which is depicted in FIG. 3.

The swirl tube 22 is open at both ends and mounted with its bottom end 23 in an opening 24 of the lower tray 20. In the lower part of the swirl tube 22 are means in the form of inclined vanes 25 to impart rotary movement to the gas flowing in via the opening 24. In the upper part of the swirl tubes 22 are vertical slits 26. The open top end 27 of the swirl tubes 22 is situated at a small distance below the upper tray 21.

In the upper tray 21 are two sorts or openings, viz. those formed by vertical tube pieces 28 and those formed by vertical tubelets 29. The tube pieces 28 are coaxial with the swirl tubes 22, have a smaller diameter than them and run down and enter the swirl tubes 22. The tubelets 29 of relatively small diameter are further from the axis of the closest tube piece 28 than the radius of the swirl tubes 22.

Figure 1:
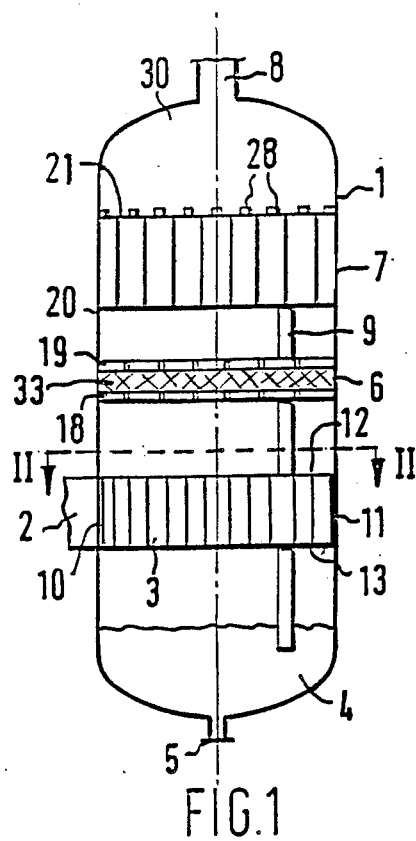
FIG. 1 is a schematic vertical sectional view of a column according to an embodiment of the invention.

The liquid discharge pipe 9 illustrated in FIG. 1 opens out at the top into the space between the trays 20 and 21, outside the swirl tubes 22.

The depicted device operates as follows:

Liquid-containing gas is fed via the gas inlet 2 into the supply and distribution assembly 3 and the gas is deflected laterally by the guide vanes 14 and distributed over the column cross section. Larger quantities of liquid carried along with the gas are separated from the gas by the guide vanes 14 and this liquid falls directly into the liquid-collecting space 4.

In the meantime the gas flows upwards in the column, assumes a better distribution over the column cross section under the influence of the pressure drop across the coalescer at location 6 and then passes the coalescer. During this passage, small liquid droplets coalesce into larger ones and, depending on the gas velocity, a smaller or larger quantity of liquid showers down out of the coalescer, finally landing in the space 4. In the space between the assembly 3 and the coalescer 6 the descending liquid will to some extent take with it liquid from the gas, so that the coalescing action of the coalescer extends downwards.

The gas flowing up and out of the coalescer and which still contains an amount of liquid in the form of coalesced drops, the amount depending on its speed, distributes itself over the swirl tubes of the centrifugal separator at location 7.

In the swirl tubes 22 a rotary movement is imparted to this gas, whereby the liquid preferentially moistens the tube wall 22 and the gas preferentially flows upwards and leaves the swirl tubes 22 via the tube piece 28 (the "primary" gas). The liquid is driven up in the form of a film along the tube wall 22 under the influence of the upwardly flowing gas and, via the slits 26 and the annular space between the tube piece 28, the top 27 of the swirl tubes 22 and the bottom of the upper tray 21, arrives in the space between trays 20 and 21 outside the swirl tubes 22. A certain amount of "secondary" gas is also carried along with the liquid into this space. In this space a separation takes place between the liquid and the secondary gas under the influence of gravity. The liquid flows via the liquid discharge pipe 9 to the space 4, without again coming into contact with the gas flowing through the column, and the secondary gas flows via the tubelets 29 to the space 30 above the centrifugal separator 7, where it is added to the primary gas from the tube pieces 28. The gas is removed from the column via the gas outlet 8 and the liquid via the liquid outlet 5.

What is claimed is:

1. In a column for removing liquid from a gas within a vertical column which contains a centrifugal liquid separator means, a horizontal coalescer, a gas inlet, a gas outlet and a liquid outlet, an improvement in which:

the horizontal coalescer is located above the gas inlet and extended over the whole cross section of the vertical column;

above the horizontal coalescer and also extended over the whole cross section of the column, the centrifugal liquid separator which consists of upper and lower horizontal trays between which a plurality of vertical swirl tubes which extend from an opening in the lower horizontal tray to some distance below a coaxial opening in the upper horizontal tray;

each vertical swirl tube being provided with a means for the discharge of secondary gas and of liquid from the space between the upper and lower horizontal trays outside the vertical swirl tubes and the lower part of each vertical swirl tube containing a means to impart to the gas a rotary movement about a vertical axis;

a means for the discharge of liquid from the space between the upper and lower horizontal trays in communication with the liquid outlet; and the liquid outlet is located below the gas inlet and the gas outlet is located above the centrifugal liquid separator.

2. A column according to claim 1, wherein the gas inlet consists of an admittance with a supply and distribution assembly extending horizontally in the column, the supply and distribution assembly consisting of a longitudinal chamber connected to the gas inlet and having at least one open side with a grid of guide vanes disposed one behind the other, seen in the direction of flow.

3. A column according to claim 1, wherein the horizontal coalescer consists of a bed of layers of metal gauze.

4. A column according to claim 1, wherein the horizontal coalescer consists of a layer of vanes.

5. A column according to claim 1, wherein the horizontal coalescer consists of a layer of structured packing.

6. A column according to claim 1, wherein the centrifugal liquid separator is provided with vertical tube pieces projecting down from the openings in the upper horizontal tray into the vertical swirl tubes and having a smaller diameter than the vertical swirl tubes.

7. A column according to claim 1, wherein the means for the discharge of secondary gas from the space between the upper and lower horizontal trays consists of vertical tubelets through the upper horizontal trays consists of one or more vertical discharge pipes extending from the space to the bottom of the column.

8. A column according to claim 1, wherein openings are provided in the top part of the vertical swirl tubes for the discharge of liquid into the space between the trays outside the swirl tubes.

9. A separator column for separation of a liquid containing gas into liquid and gas components across a wide range of gas velocities, said separator column comprising:

a vertical column;

a liquid outlet at the bottom of the vertical column;

a gas inlet to the vertical column above the liquid outlet;

a horizontal supply distribution assembly comprising:

a longitudinal chamber in communication with the gas inlet, said longitudinal chamber having at least one opening into the vertical column; and a grid having a plurality of guide vanes disposed across the opening, one behind the other, in relation to the direction of flow;

a coalescer disposed horizontally across the whole cross section of the vertical column above the horizontal supply distribution assembly;

a centrifugal separator above the coalescer, said centrifugal separator comprising:

an upper horizontal tray connected to the vertical column;

a lower horizontal tray connected to the vertical column;

a plurality of vertical swirl tubes which extend from an opening in the lower horizontal tray to some distance below a coaxial opening in the upper horizontal tray;

a means in the lower part of the each vertical swirl tube to impart to the gas a rotary movement about a vertical axis;

vertical tube pieces projecting down from the opening in the upper horizontal tray into the vertical swirl tubes and having a smaller diameter than the vertical swirl tubes;

vertical tubelets through the upper horizontal tray providing a means for the discharge of secondary gas from the space between the trays; and a means for the discharge of liquid from the space between the upper and lower horizontal trays; and a gas outlet above the centrifugal separator.

10. A separator column in accordance with claim 9 wherein the horizontal supply distribution assembly further comprises:

a front vertical wall attached around the gas inlet;

a rear vertical wall substantially across the diameter of the vertical column opposite the front vertical wall and in line with the direction of flow;

trapezoidal upper and lower horizontal walls connecting the front and rear vertical walls to form the longitudinal chamber having open sides; and one of the grids of guide vanes disposed across each of the open sides of the longitudinal chamber, each guide vane curving from a part interior to the longitudinal chamber which is substantially parallel with the direction of flow to an exterior part substantially perpendicualr to the direction of flow.

11. A separator column in accordance with claim 10 wherein the means for the discharge of liquid from the space between the upper and lower horizontal trays is a liquid discharge pipe communicating between the lower horizontal tray and the lower part of the vertical column beneath the supply and distribution assembly.

* * * * *